(No Model.) 3 Sheets—Sheet 1.

T. P. BENTON.
MACHINERY FOR SEPARATING THE ORES OF THE PRECIOUS METALS.

No. 273,703. Patented Mar. 13, 1883.

Witnesses:
H. H. Schott
A. R. Brown

Inventor
Thomas P. Benton
Per C. H. Watson & Co. Attorneys.

(No Model.) 3 Sheets—Sheet 2.
T. P. BENTON.
MACHINERY FOR SEPARATING THE ORES OF THE PRECIOUS METALS.
No. 273,703. Patented Mar. 13, 1883.
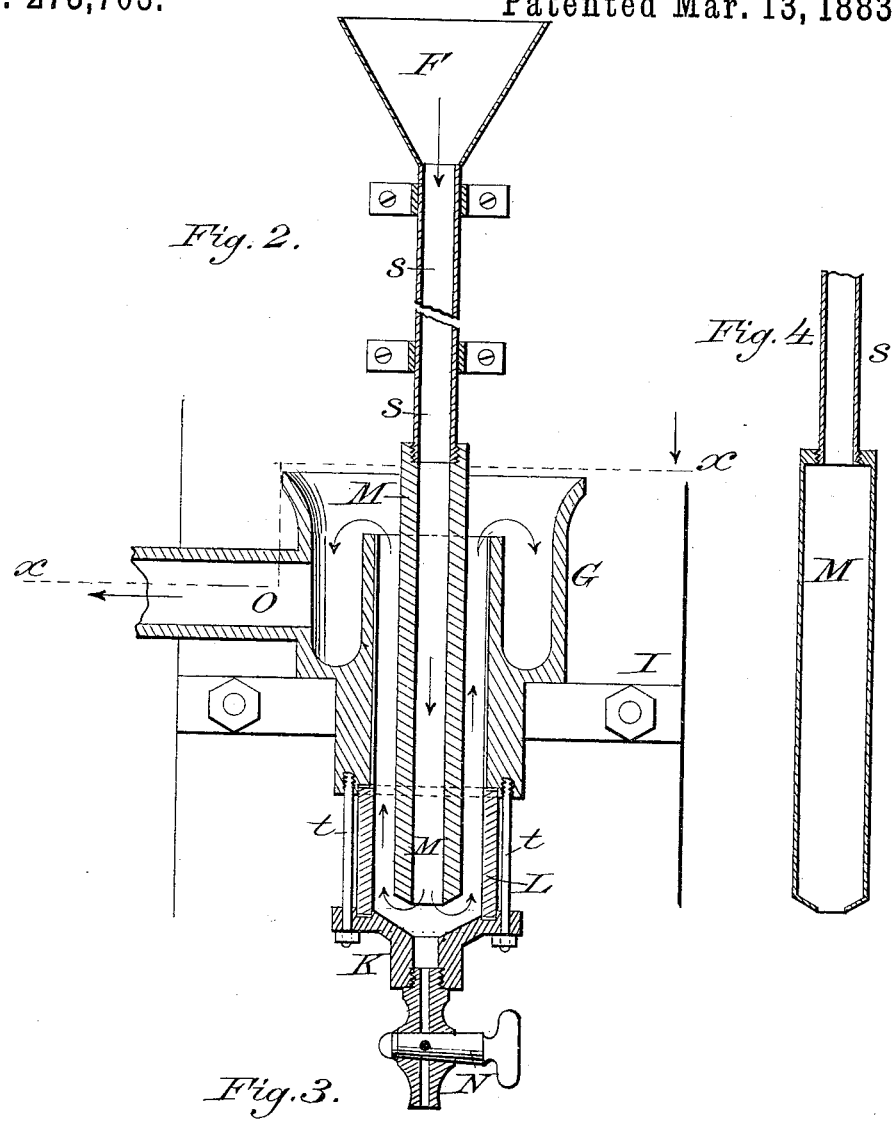
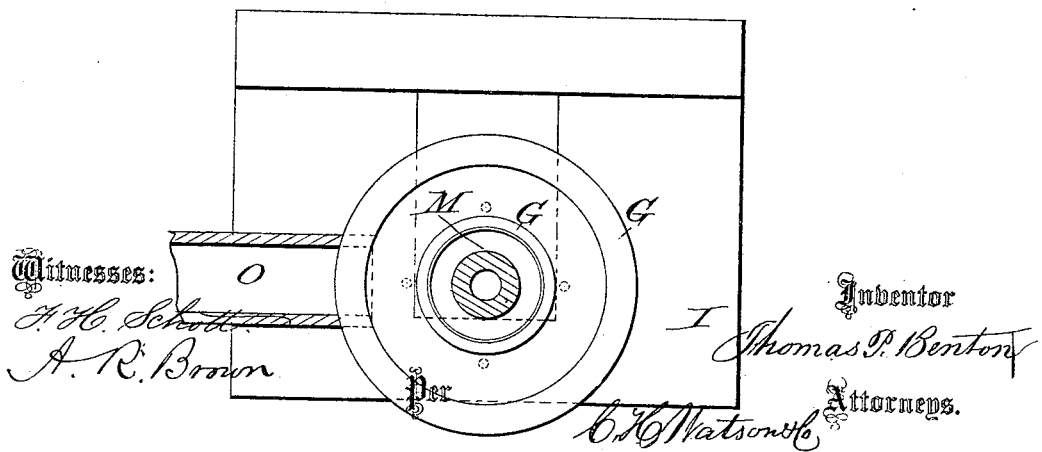

(No Model.) 3 Sheets—Sheet 3.

T. P. BENTON.
MACHINERY FOR SEPARATING THE ORES OF THE PRECIOUS METALS.

No. 273,703. Patented Mar. 13, 1883.

Witnesses:
F. H. Schott.
A. R. Brown

Inventor
Thomas P. Benton
Per C. H. Watson &Co Attorneys.

UNITED STATES PATENT OFFICE.

THOMAS P. BENTON, OF LA CROSSE, WISCONSIN.

MACHINERY FOR SEPARATING THE ORES OF THE PRECIOUS METALS.

SPECIFICATION forming part of Letters Patent No. 273,703, dated March 13, 1883.

Application filed May 24, 1882. (No model.)

*To all whom it may concern:*

Be it known that I, THOMAS P. BENTON, of the city of La Crosse, in the county of La Crosse and State of Wisconsin, have invented certain new and useful Improvements in Machinery for Separating the Ores of the Precious Metals; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

Figure 1:
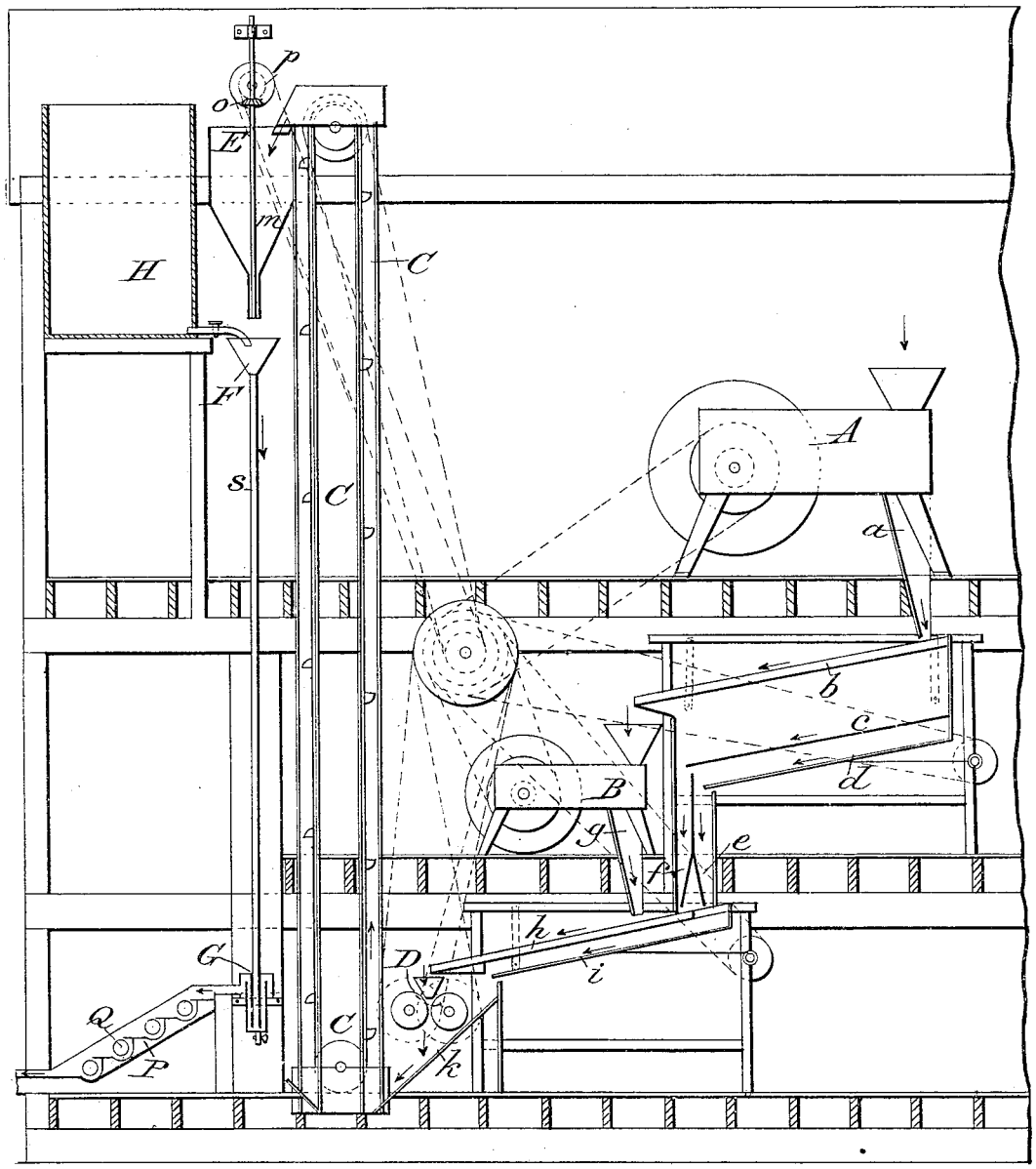
Figure 6:
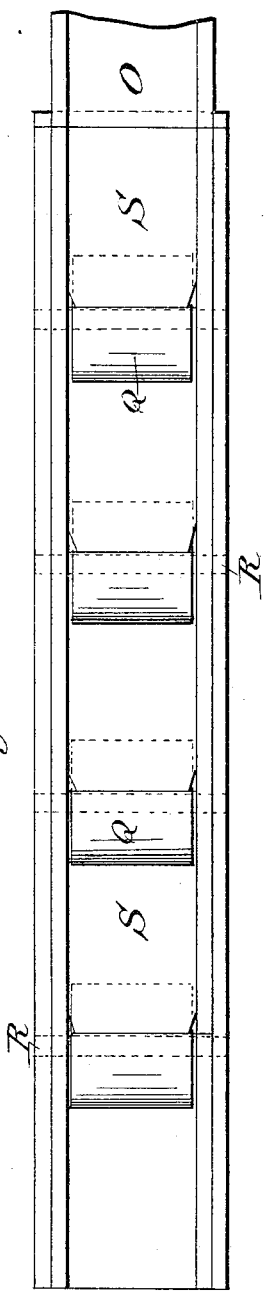
Figure 5:
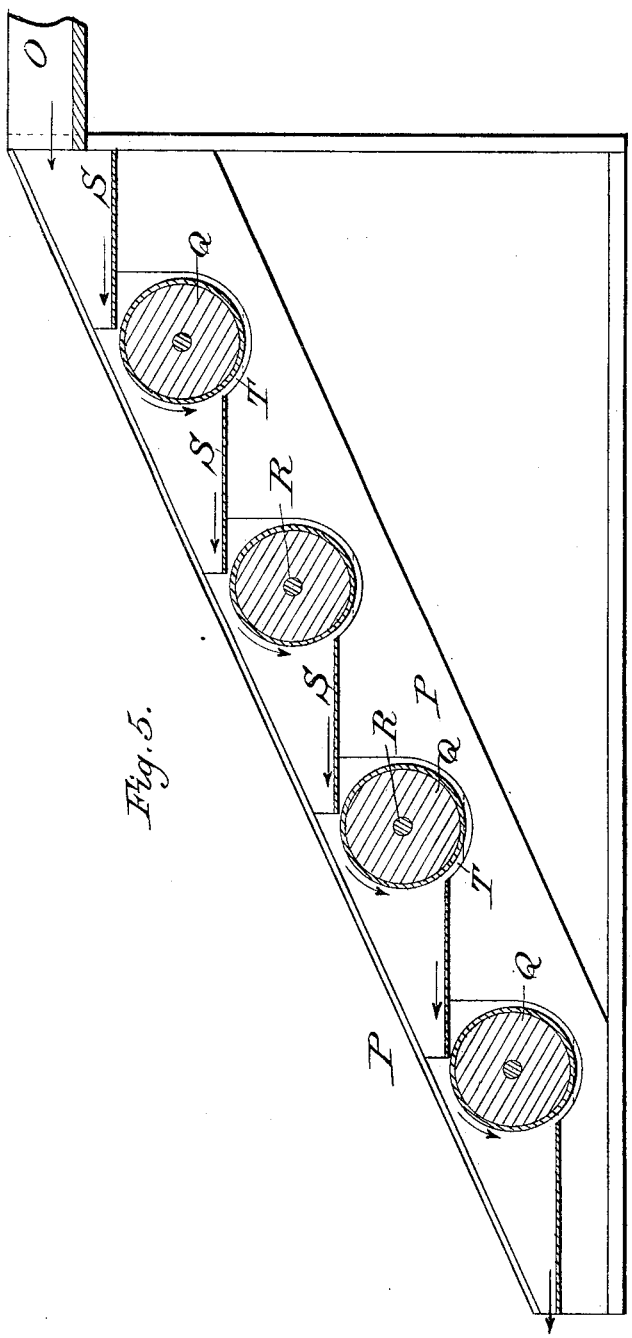

In the annexed drawings, illustrating the invention, Figure 1 is a vertical elevation of my improved apparatus. Fig. 2 is a vertical section of amalgamator. Fig. 3 is a section on the line $xx$ of Fig. 2. Fig. 4 is a detail illustrating a modification, to be hereinafter referred to. Fig. 5 is a vertical sectional elevation, illustrating an additional amalgamator for retaining and amalgamating any precious metal contained in the tailings; and Fig. 6 is a plan or top view of the same.

Like letters of reference are used to designate the same parts in the several views.

In carrying out my invention, the ore to be treated is first introduced into the hopper of an "Alden" crusher, A, or any other suitable rock-crushing machine. From this machine the crushed ore passes through a chute, $a$, to an inclined sieve, $b$, which is clothed with No. 20 wire. All ore which is not crushed fine enough to pass through this sieve is conducted along the inclined sieve $b$ to the hopper of a second crusher, B, while all the finely-crushed ore dropping through the meshes of the sieve $b$ falls upon the inclined sieve $c$, which is arranged at a suitable distance beneath the sieve $b$, and is clothed with No. 60 wire. The sieve $c$ is somewhat shorter than the sieve $b$, and is arranged a short distance above an inclined diaphragm, $d$, which latter is a little shorter than the sieve $c$. The diaphragm $d$ and sieve $c$ communicate respectively with the chutes or passages $ef$. The crushed ore that passes from the second crusher, B, is carried by the chute $g$ to an inclined sieve, $h$, which is arranged beneath the crusher B, and is clothed with No. 60 wire. The fine ore that passes through this sieve $h$ is caught upon an inclined diaphragm, $i$, which communicates by an opening in the upper end of the sieve $h$ with the chute or passage $e$ leading from the upper diaphragm, $d$, so that the fine ore from the upper crusher after falling upon the upper diaphragm, $d$, is passed to the lower diaphragm, $i$, and together with the fine ore from the lower crusher, B, is passed along an inclined plane, $k$, to the lower end of the elevator C. All the particles of ore which are too coarse to pass through the sieve $c$ are carried by the chute $f$ to the sieve $h$, and pass thence to the crushing-rolls D, together with those particles received from the crusher B which are too coarse to pass through the latter sieve. The crushing-rolls D D are arranged so as to reduce to the required fineness such ore as is delivered to them, the finely-crushed ore after passing through the rolls falling upon the inclined plane $k$, and being fed to the elevator, together with the ore that passes through the sieves.

The elevator C is provided with suitable devices for raising the crushed ore and delivering it to the hopper E. In this hopper is arranged a clearing-rod, $m$, which is provided with a bevel-gear, $o$, that meshes with a gear, $p$, by means of which the rod is rotated for the purpose of feeding the ore to a funnel, F, that is arranged beneath the hopper. This funnel F is connected by a vertical tube, $s$, with the amalgamator G, which is provided with a stop-cock for withdrawing the mercury, so that the precious metals may be separated therefrom as required.

A water-tank, H, is arranged to communicate with the funnel F by means of a suitable tube provided with a stop-cock, so that the necessary supply of water can be regulated.

A central pipe may be arranged to pass through the hopper or funnel F and part way down the supply-tube, for the purpose of conveying chlorine gas or any neutralizing gas or acids that may be necessary to prepare the gold, which in its natural state, without such gas or acids, would not amalgamate with the mercury. The upper end of this pipe should be connected with any suitable generator or reservoir. The object of this arrangement is to work refractory ores containing very fine flour gold that is coated with some substance which prevents it from amalgamating with the mercury.

The amalgamator consists of the double tubular casting G, which is supported in a suitable frame or bracket, I, the lower casting, K, secured to the upper casting by stud-bolts t t, and the intermediate glass tube, L, which is supported between the upper and lower casting, and is provided at each end with a suitable packing. A copper tube, M, is arranged centrally within the casting, G, and extends down into the glass tube L nearly to the casting K. This copper tube is connected at its upper end to the tube s, which connects with the funnel or hopper F. The casting G has a copper lining, and this lining, as well as the copper tube M, should be properly amalgamated.

If desired, the copper tube M may be constructed in the form shown in Fig. 4, which will give it a larger amalgamating-surface at its lower end.

N is the stop-cock in the lower end of the casting K, through which the contents of the amalgamator are withdrawn when required.

The casting G is provided with a tube, O, through which the tailings pass, and this tube communicates with a series of additional amalgamators of modified construction, which are formed in an inclined bed-piece, P, shown in Figs. 1 and 5. This bed-piece is supported in a suitable frame, and is provided at intervals with concave receptacles for the rollers Q, which are placed loosely upon movable shafts R, and are provided with suitably amalgamated copper coverings. A series of amalgamated metal plates, S, are arranged horizontally, one between each pair of rollers, so as to project partly over each roller to a point a little back of its center. The concave receptacles T in which the rollers Q are placed each contain a suitable quantity of mercury.

It will be seen that when the tailings are carried over from the amalgamator G through the tube O and onto the plate S any mercury or gold or silver that may pass over from the amalgamator G will be caught in the receptacles T, while the water and débris will pass off over the rollers in the direction indicated by the arrows.

The rolls Q may be turned from time to time to present a new surface, and the sieves may be continued to any desired length, so as to insure the retention and amalgamation of any metal that may escape from the main amalgamator. A blast-fan may be attached to the outlet of the supplementary amalgamator P', so that the material may be drawn through the mercury by the action of the exhaust, the use of water being thus dispensed with. In this case it is obvious that the amalgamators G and P' must be provided with suitable covers.

The operation of my improved amalgating apparatus will be apparent from the foregoing description. It will be seen that the ore, having been gradually reduced to the requisite degree of fineness by means of several successive crushings, is elevated to the mouth of the hopper E, whence it passes into and through the funnel F and tube s to the amalgamator G. Water may also be introduced to the amalgamator through the funnel F and tube s, being readily obtained from the tank H, as required. The pipe s should be of such length that the water it may contain will overbalance the mercury contained in the amalgamator and the waste material in the space above the mercury. A sufficient quantity of mercury to nearly fill the glass tube L will usually be employed, though a larger or smaller quantity may be used, if desired. The water and pulverized ore fed through the pipe s descends to the bottom of the tube M, passing through the mercury in the lower end of the tube M and inclosing glass tube L, and overflows through the horizontal tube O. In its passing through the mercury contained in the amalgamator G the gold or silver contained in the ore is brought into direct contact with the mercury, and is thus readily amalgamated therewith. The specific gravity of the mercury and amalgamated metal is usually sufficient to retain the same in the lower part of the amalgamator, while the débris and tailings are forced upward and out through the overflow-tube O by the pressure of the descending column of ore.

From time to time, as deemed necessary, the cock N may be turned so as to enable the amalgam to be removed for the purpose of separating the metals therefrom.

Should any mercury or unamalgamated metals pass off with the tailings, they will be saved by passing through the second amalgamator P, as before explained.

It will be seen that the operation will be continuous so long as ore and water are suppled. If desired, however, the use of water may be dispensed with, and an exhaust-fan be arranged to draw the material through the mercury contained in the amalgamators.

The filtering-column of mercury may be of any desired height, so long as the ratio of one to thirteen in regard to the height of the water in the pipe s is observed, with about five feet additional for working-pressure.

By referring to Fig. 1 it will be seen that the several ore-crushers, as well as the elevator and the clearing device in the hopp r through which ore is fed to the amalgamator, are all simultaneously operated by means of power applied to a main driving shaft or drum, which is located at a convenient point in any convenient manner.

It will be understood that I do not herein claim the devices for milling the ore prior to amalgamation, nor do I claim the manner of employing neutralizing gases or acids in the amalgamation of refractory ores, as described, such being reserved for separate applications.

Having thus described my invention, what I claim as new, and desire to secure by Letters Patent, is—

1. An amalgamator composed of the double tubular casting G, having outlet-pipe O, the lower casting, K, provided with cock N, the intermediate glass tube, L, the bolts t t, connecting the casting G and K, and the central tube, M, all constructed and combined substantially as and for the purpose described.

2. The combination of the amalgamator G, having exit-tube O, and cock N, the funnel F, located above said amalgamator and connected thereto by means of suitable tubes, and the inclined auxiliary amalgamator P', having concave receptacles T, rollers Q, and horizontal plates S, all constructed and arranged substantially as and for the purpose described.

In testimony that I claim the foregoing as my own I have hereto affixed my signature in presence of two witnesses.

THOMAS P. BENTON.

Witnesses:
W. E. HOWE,
J. E. PARKER.